United States Patent [19]

Schafer et al.

[11] 4,395,974
[45] Aug. 2, 1983

[54] ANIMAL WATERING APPARATUS

[75] Inventors: Kenneth L. Schafer, Le Sueur; Maurice L. Peterson, Kerkhoven, both of Minn.

[73] Assignee: Fibernetics, Inc., Le Sueur, Minn.

[21] Appl. No.: 270,985

[22] Filed: Jun. 5, 1981

Related U.S. Application Data

[63] Continuation-in-part of Ser. No. 159,812, Jun. 16, 1980, Pat. No. 4,343,264.

[51] Int. Cl.³ .............................................. A01K 7/02
[52] U.S. Cl. .................................................... 119/73
[58] Field of Search .................... 119/72, 73, 74, 75, 119/78, 79, 80

[56] References Cited

U.S. PATENT DOCUMENTS

| | | | |
|---|---|---|---|
| 226,812 | 4/1880 | Warren | 119/79 |
| 232,077 | 9/1880 | Shaw et al. | 119/78 |
| 351,781 | 11/1886 | Kouns | 119/73 |
| 642,952 | 2/1900 | Bess | 119/79 |
| 648,953 | 5/1900 | Hanson | 119/73 X |
| 669,415 | 3/1901 | Jacobs | 119/73 |
| 1,028,998 | 6/1912 | Eaton | 119/73 |
| 1,037,093 | 8/1912 | Wendorf et al. | 119/72 |
| 1,228,230 | 5/1917 | Muller | 119/73 |
| 1,240,785 | 9/1917 | Shaw | 119/73 |
| 1,274,894 | 8/1918 | Kirby | 119/78 |
| 1,329,939 | 2/1920 | Todd . | |
| 1,337,075 | 4/1920 | Johnson | 119/73 |
| 1,359,885 | 11/1920 | Fullerton | 119/73 |
| 1,372,188 | 3/1921 | Paulson | 119/73 |
| 1,375,039 | 4/1921 | Eaton | 119/73 |
| 1,402,953 | 1/1922 | Pagel | 119/73 |
| 1,452,558 | 4/1922 | Jackson | 119/72 X |
| 1,477,447 | 6/1922 | Ritchie | 119/80 |
| 1,560,088 | 11/1925 | Marquardt | 119/73 X |
| 1,563,775 | 12/1925 | Miller et al. | 119/78 |
| 1,575,796 | 3/1926 | Scheihing | 119/78 |
| 1,663,789 | 3/1928 | Anderson | 119/73 |
| 1,725,628 | 8/1929 | Gerhardt | 119/78 |
| 1,824,154 | 9/1931 | Johnson et al. | 119/73 |
| 1,835,352 | 12/1931 | Stangl | 119/73 |
| 1,900,604 | 3/1933 | Gustafson | 119/78 |
| 1,989,477 | 1/1935 | Ferris | 119/75 |
| 2,087,173 | 7/1937 | Uden | 137/68 |
| 2,164,716 | 7/1939 | Kreft | 119/73 |
| 2,252,623 | 8/1941 | Gerken | 119/73 |
| 2,358,303 | 9/1944 | Byers | 119/73 |
| 2,466,135 | 4/1949 | Townsend | 119/73 |
| 2,629,040 | 2/1953 | Smith | 219/38 |
| 2,635,580 | 4/1953 | Donahoe et al. | 119/73 |
| 2,825,302 | 3/1958 | Donahoe | 119/78 |
| 2,963,568 | 12/1960 | Tellefson | 219/38 |
| 2,990,809 | 7/1961 | Phillips | 119/78 |
| 3,027,872 | 4/1962 | Nelson | 119/81 |
| 3,106,189 | 10/1963 | Kopps | 119/73 |
| 3,371,652 | 3/1968 | Louks et al. | 119/51.11 |
| 3,745,977 | 7/1973 | Martin | 119/73 |
| 3,759,228 | 9/1973 | Keen | 119/79 |
| 3,835,882 | 9/1974 | Barker et al. | 137/445 |
| 3,841,268 | 10/1974 | Bunger | 119/73 |
| 3,943,889 | 3/1976 | Sparber | 119/73 |
| 4,003,340 | 1/1977 | Kuzara et al. | 119/73 |
| 4,100,885 | 7/1978 | Kapplinger | 119/73 |
| 4,130,090 | 12/1978 | Bohlmann | 119/73 |

OTHER PUBLICATIONS

M & H Equipment, Inc., Box 773, Sioux Falls, S.D., "The Hogger".
Ritchie Industries, Inc., Conrad, Iowa, "Relax, Ritchie Waters 'em Right".

*Primary Examiner*—Robert P. Swiatek
*Attorney, Agent, or Firm*—Burd, Bartz & Gutenkauf

[57] ABSTRACT

An animal watering apparatus including a thermo insulated tank having a water chamber supplied with water with a water pipe extended to the upper portion of the chamber and a float valve mounted on the pipe to maintain a preselected water level in the chamber. A top wall mounted on the tank provides a pair of animal drinking openings. Covers pivoted on the top wall close the openings. A pair of baffles extend downwardly from the inside surface of a top wall. The baffles are located on opposite sides of the float valve and extend across the water chamber. Opposite ends of the baffles engage the tank side walls. The lower edges of the baffles are normally below the surface of the water to isolate the float valve and water pipe outlet from the drinking openings so that cold ambient air does not move across the surface of the water to the vicinity of the float valve to prevent the float valve from freezing in cold weather. The baffles act as guides for directing convection circulation of the water in the water chamber around the water pipe.

24 Claims, 17 Drawing Figures

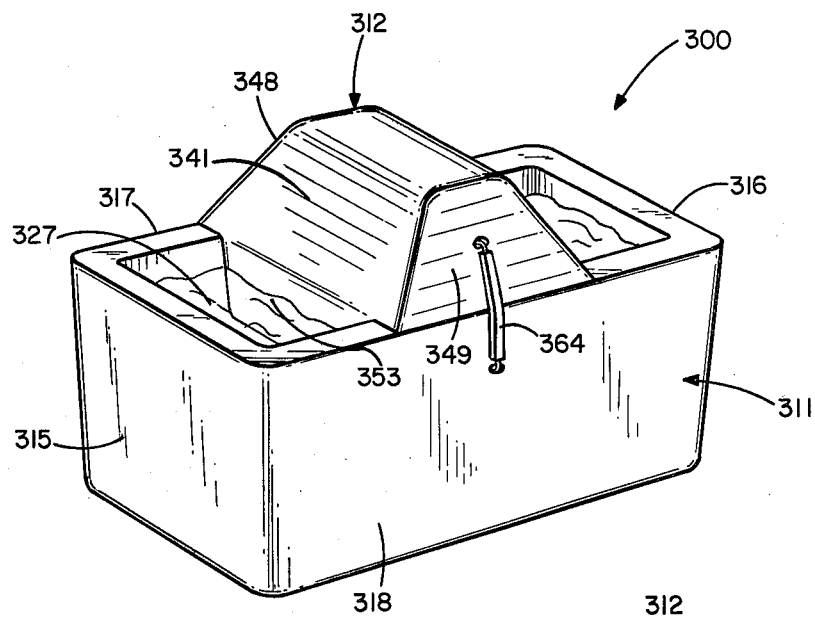
FIG. 12
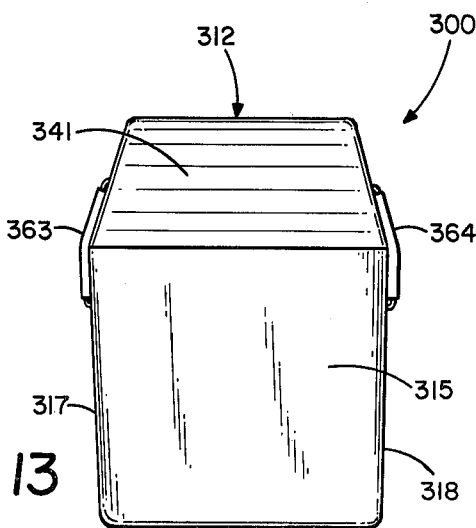
FIG. 13
FIG. 14
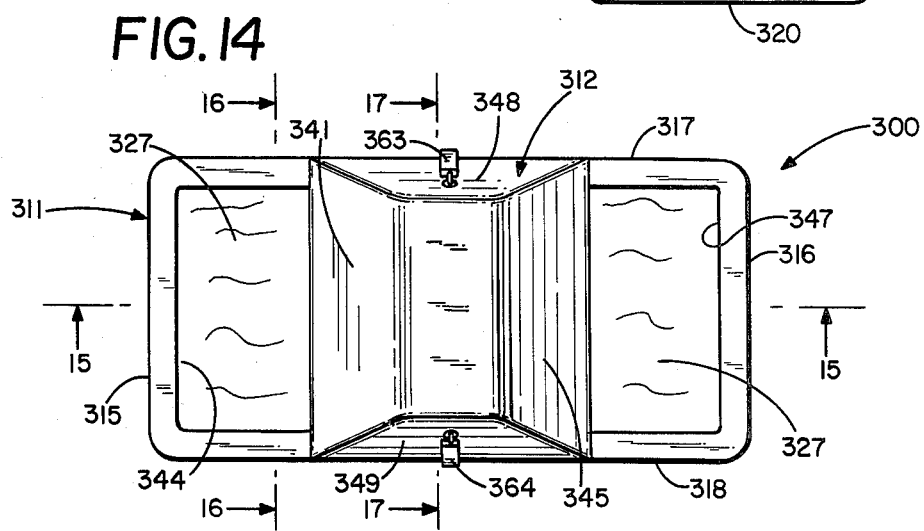

ANIMAL WATERING APPARATUS

CROSS REFERENCE TO RELATED APPLICATION

This application is a continuation-in-part of U.S. application Ser. No. 159,812 filed June 16, 1980, now U.S. Pat. No. 4,343,264.

SUMMARY OF THE INVENTION

The invention pertains to a watering apparatus to provide an outdoor, unattended source of drinking water for animals such as cattle and hogs. During the winter in cold climates, animal drinking water provided from conventional open sources such as a water trough is prone to freeze unless attended. Heating elements have been used with water tanks to prevent water from freezing. Likewise, water provided by natural sources such as a pond or spring is also prone to freezing. It is inconvenient to frequently attend such supply sources to keep them open, yet it is desirable that the animals have an uninterrupted supply of water to drink at will.

The present invention provides an unattended watering apparatus to furnish fresh water to an outdoor location to animals at all temperature conditions. The watering apparatus does not require auxiliary heating means, as gas or electric heaters. The invention includes an insulated water holding tank with a removable insulated top wall. Water is stored in the tank chamber and is introduced into the chamber through a water inlet pipe. Drinking openings in the top wall are normally closed by covers which can be pivoted open by an animal to gain access to the water in the chamber. The covers are hinged insulated structure, flap lids, or flexible split domes. In one embodiment, the covers are omitted. The water level in the chamber is maintained by a float valve assembly connected to the top of the inlet pipe. Float valve assembly permits water to flow through the inlet pipe responsive to a lowering of the water level by a drinking animal. A pair of dams or insulated transverse baffles extend downwardly from the inside surface of the top wall into the water in the tank in straddling relationship to the top of the inlet pipe and the float valve assembly to isolate them and the water in the immediate vicinity from the drinking openings. The baffles are parallel heat insulated members having ends in engagement with the insides of the side walls of the tank. The inside surfaces of the baffles provide transverse generally vertical barriers or walls which serve to substantially confine the circulation of the water to a center sub-chamber of the tank. The outside surfaces of the baffles taper inwardly and are spaced from the drinking openings and facilitate the water circulation patterns in the end sub-chambers of the tank. When one or more of the covers are open, cold air is not permitted to flow from the drinking opening across the water surface to the inlet pipe and float valve. The water entering the tank through the inlet pipe is isolated from the cold effects of the drinking openings and is maintained at a warmer temperature for a longer period of time.

IN THE DRAWINGS

FIG. 12 is a perspective view of a third modification of the animal watering apparatus of the invention;

FIG. 13 is an end elevational view of the animal watering apparatus of FIG. 12;

FIG. 14 is a top plan view of the animal watering apparatus of FIG. 12;

DESCRIPTION OF PREFERRED EMBODIMENTS

Figure 3:
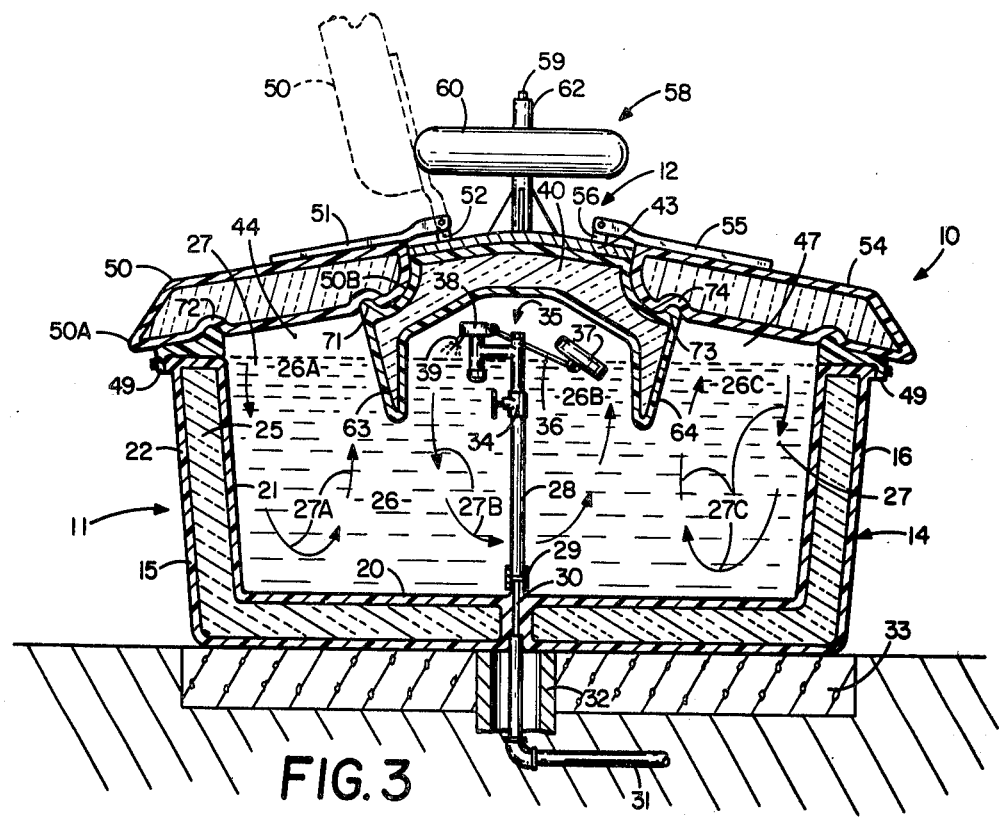
FIG. 3 is a sectional view of the animal watering apparatus of FIG. 2 taken along the line 3—3 thereof.

Referring to the drawings, there is shown an animal watering apparatus indicated generally at 10 to provide fresh water for animals such as cattle in an outdoor environment at all temperature conditions. Watering apparatus 10 includes a tank 11 having a removable top unit or wall 12 and a base or bottom unit 14. Base 14 is a generally rectangular upwardly open top box structure having upright end walls 15, 16 and upright sidewalls 17, 18 all integrally connected at their lower edges to a bottom wall 20. As shown in FIG. 3, the sidewalls 17, 18, end walls 15, 16, and bottom wall 20 can be formed of a first rectangularly shaped upwardly open molded plastic inner shell 21 and a second exterior rectangularly shaped molded plastic outer shell 22 spaced from the inner shell 21 and joined at their respective upper edges by a horizontal ledge 23. The space between the inner and exterior shells 21, 22 is filled with an insulative material such as a foamed plastic 25 of polystyrene or polyurethane or the like. The walls of base 11 define a chamber 26 for holding a supply of drinking water 27.

A water inlet pipe 28 extends upwardly from a coupling 29 connected to a tubular nipple 30 on bottom wall 20. A water pipe 31 extends from a location beneath the frost line in ground through a collar or conduit 32 located in a flat horizontal support slab 33 supporting watering apparatus 10 with respect to ground.

A hand operated On-Off valve 34 is attached to the upper end of pipe 28. A float valve assembly 35 is assembled to the upper end of valve 34 extended above the top edge of duct 28. Float valve 35 can be of any usual and preferred type, for example, like that shown in U.S. Pat. No. 3,835,882 to Barker et al. A float arm 36 is connected at an outer end to a float 37 which rests on the upper surface of water 27. The inner end of float arm 36 is connected to a valve body 38. As the level of water 27 drops beneath a preselected value upon consumption of water by animals, the float 37 moves downwardly along with the arm 36 to open the valve body 38 and permit discharge of water through a discharge nozzle 39. As the water level rises to the preselected level, float 37 and arm 36 are moved upwardly to close the valve body 28 and halt further discharge of water through the nozzle 39.

Figure 4:
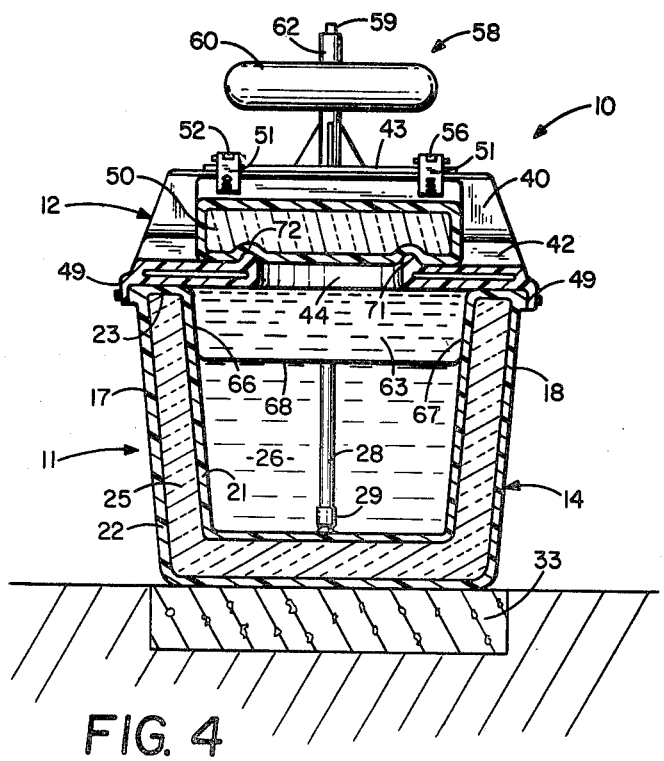
FIG. 4 is a sectional view of the animal watering apparatus of FIG. 2 taken along the line 4—4 thereof.

Top wall 12 has an insulated raised central portion 40 located midway between end walls 15, 16 of base 14 and extended transversely across base 14 between sidewalls 17, 18. Raised central portion 40 has a first inwardly curved shoulder 41. A first top end portion 42 extends from shoulder 41 to the upper edge of end wall 15 of base 14. First end portion 42 has a first generally round drinking opening or watering hole 44. Raised central portion 40 has a second curved shoulder 45 opposite first shoulder 41. A second top end portion 46 extends from second shoulder 45 to the upper edge of the other end wall 16 of base 14. Second end portion 46 has a second drinking opening or watering hole 47. As shown in FIG. 4, the outer edges of the central and end portions of top wall 12 have a downwardly curved lip 49 surrounding the top of the side and end walls 15, 16, 17 and 18 of base 11.

Figure 1:
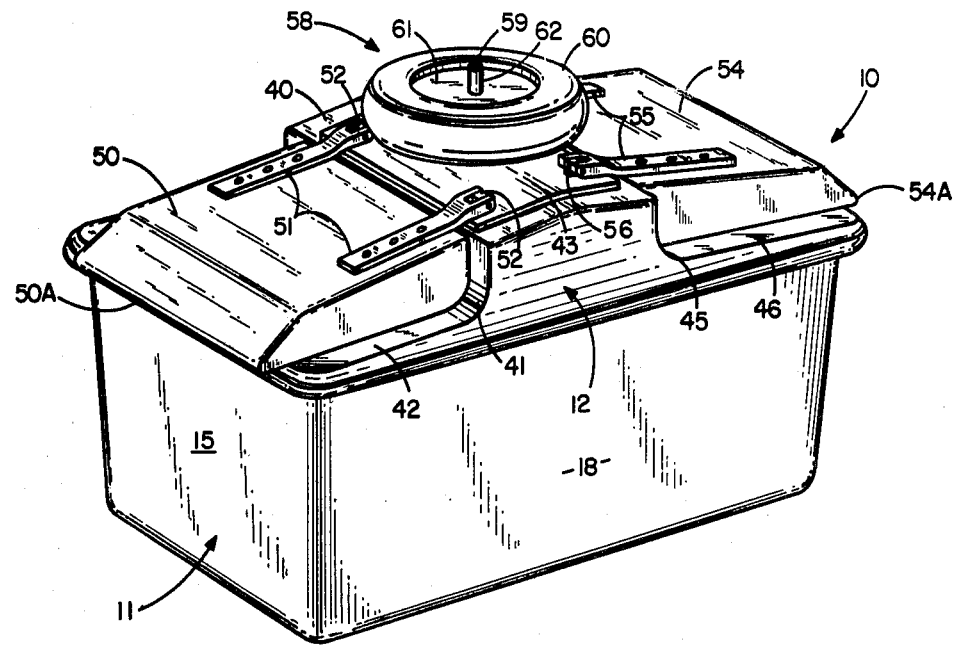
FIG. 1 is a perspective view of an animal watering apparatus of the invention.
Figure 2:
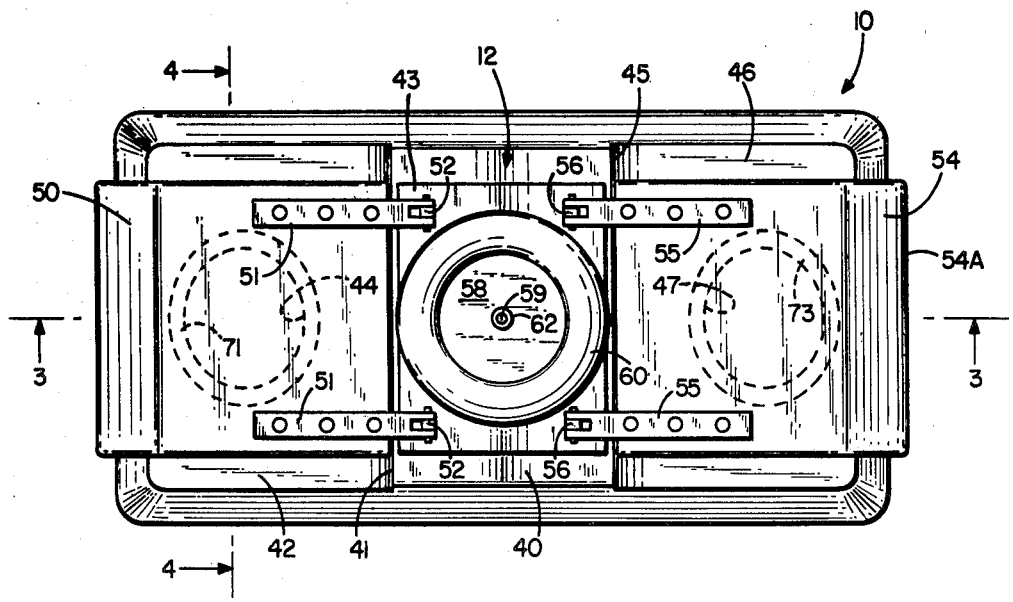
FIG. 2 is a top elevational view of the animal watering apparatus of FIG. 1.

A first insulated lid or cover 50 covers the first drinking opening 44 on the first end portion 42 of top wall 12. Cover 50 has inner and outer skins or layers surrounding a core of insulation material, as foamed plastic. Other types of insulation can be used for cover 50. Top wall 12 has an upwardly projected continuous rib 71 surrounding drinking opening 44. The inner skin of cover 50 has an upwardly directed groove 72 for accommodating rib 71 when cover 50 is in the closed position. Rib 71 and groove 72 provide a cover-to-tank seal to protect the water in the tank from outside air. Hinge straps 51 are fastened at one end to the upper surface of first cover 50 and extend to a plate 43 on the upper surface of raised central portion 40 of top wall 12. The opposite ends of hinge straps 51 are pivotally connected to hinge blocks 52 mounted on plate 43 attached to the upper surface of central portion 40. The first cover 50 is pivotal between position in covering relationship to the first drinking opening 44 shown in full lines in FIGS. 1 and 3, to a position clear of the first drinking opening 44, as shown in phantom in FIG. 3, whereby accessibility to the drinking opening 44 can be gained by an animal seeking water to drink. The lower interior end 50B of first cover 50 is curved so to fit with the first curved shoulder 41 of raised central portion 40. The lower outer corner 50A of first cover 50 extends outwardly from the upper edge of first end wall 15 in overlapping relationship thereto whereby an animal can use its nose to lift the first cover 50 from the closed toward the open position in order to gain access to the drinking opening 44. Animals such as cattle easily learn such a function in order to gain access to the water.

A second insulated lid or cover 54 covers the second drinking opening 47 on the second end portion 46 of top wall 12. Cover 54 is identical to cover 50. Top wall 12 has an upwardly projected continuous rib 73 surrounding opening 47. Cover 54 has a groove 74 for accommodating rib 73. Rib 73 and groove 74 provide a cover-to-tank seal to protect the water in the tank from outside air. Second cover 54 is disposed in symmetrical relationship to the first cover 50 and has hinge straps 55 fastened at one end to the upper surface thereof. The opposite ends of hinge straps 55 extend to the upper surface of raised central portion 40 and are pivotally connected to hinge blocks 56. Hinge blocks 56 are secured to plate 43 attached to cover portion 40. Second cover 54 is pivotal between a position in covering relationship to the second opening 47, and a position upwardly and out of the way of the second drinking opening 47 to permit access thereto by an animal for purposes of drinking water. The lower outer edge 54A of second cover 54 extends outwardly from the upper edge of the second end wall 16 so as to be engageable by the nose of an animal for movement of the second cover 54 upwardly about the pivot block 56 to a position out of the way so that the animal has access to drinking opening 47.

A bumper assembly, indicated generally at 58, is mounted on plate 43 to limit pivotal movement of first and second covers in open positions and to urge them toward closed positions when an animal has finished watering. An upright post or standard 59 is fixed to the top of plate 43. Post 59 carries a toroidal bumper 60. Bumper 60 is fastened to an interior rim 61 which is in turn secured to a tubular member 62 telescoped over post 59 so that bumper 60 is free to rotate on post 59. Bumper 60 can be formed of a soft pliable material such as rubber. Bumper 60 can be a pneumatic tire.

As shown in phantom in FIG. 3, the pivotal movement of first cover 50 is limited by the outer edge of the bumper 60. When an animal is watering at the first watering opening 44, the first cover 50 is urged in engagement with the bumper 60. Upon release of the first cover 50 by the animal, the bumper 60 resiliently urges the first cover 50 back toward the closed position. Bumper 60 likewise operates on the second cover 54 to urge it back toward the closed position once the animal has finished watering and has left the watering apparatus.

A dam or baffle assembly is provided to reduce heat loss in the winter from the water 27 located in chamber 26 to the surrounding atmosphere and to retard heat gain during hot weather. A first insulated transverse dam or baffle 63 extends downward from the lower surface of top wall 12 in the vicinity of the first shoulder 41 of raised central portion 12 and in the vicinity of the inside edge of first watering opening 44. First baffle 63 extends downwardly into chamber 26 to a location beneath the normal waterline of water 27 or the interface between the water 27 and the air located in the upper part of chamber 26. As shown in FIG. 4, first baffle 63 extends the width of chamber 26 between sidewalls 17, 18 of base 14 in dividing relationship to the first drinking opening 44 and the water inlet 30. Baffle 63, shown in FIG. 4, has downwardly and inwardly inclined sides 66 and 67 located in engagement with inner shell 21 of base 14. A transverse bottom edge 68 extends between sides 66 and 67 below the normal level of water in tank chamber 26. Baffle 63 extends 8 to 10 cm below the normal level of water in tank chamber 26.

A second insulated transverse baffle 64 extends downwardly from the lower surface of top wall 12 in the vicinity of the second shoulder 45 of raised center portion 12 and in the vicinity of the inside edge of the second watering hole 47. Second baffle 64 extends downwardly into the chamber 26 to a location well beneath the normal waterline of water 27, and extends the width of chamber 26 between the sidewalls 17, 18 of base 14 in dividing relationship between second drinking opening 47 and inlet pipe 28. Second baffle 64 is identical to first baffle 63.

The first and second baffles 63, 64 together form upper sub-chambers 26A, 26B, and 26C of chamber 26 which are isolated from one another by the first and second baffles 63, 64. The first sub-chamber 26A is associated with the first drinking opening 44. The second sub-chamber 26B is centrally located and associated with the discharge nozzel 30 of float valve 35, float 37 and water in the surrounding vicinity. The third sub-chamber 26C is associated with the second drinking opening 47. The water in sub-chamber 26B circulates in a generally circular pattern between baffles 63 and 64 and the bottom wall 20 as indicated by arrows 27B. The baffle 63 directs the water discharged from valve 38 downwardly. The relatively warm water circulates upwardly thereby preventing valve 38 and water in sub-chamber 26B from freezing. The inside surfaces of the baffles 63 and 64 provide transverse generally vertical barriers or walls which serve to substantially confine the circulation 27B to center sub-chamber 26B. The water in sub-chamber 26A and 26C will have separate circulations or flow patterns as indicated by arrows 27A and 27C. The outside surfaces of baffles 63 and 64 converge or taper downwardly into chamber 26. These outside surfaces facilitate the water circulation patterns 27A and 27C in sub-chambers 26A and 26C. The cold water at the top of the sub-chambers 26A and 26C will flow downward, pick up heat from the warmer water, and then move upwardly. This water circulation is continuous and keeps the water at the top of sub-chambers 26A and 26C from freezing.

In the winter, water entering through inlet pipe 28 is relatively warmer than the ambient air. When a cover is opened by an animal to drink, for example first cover 50, the surface of the water in sub-chamber 26A is exposed to air at ambient temperature. First baffle 63 inhibits movement of the cold air over the water surface to the water-air interface of the other two sub-chambers 26B and 26C. Likewise, the water-air interface at sub-chamber 26C is isolated from the other two sub-chambers when the second cover 54 is opened. First and second baffles 63, 64 continuely isolate the second sub-chamber 26B, the valve 35 and water in the vicinity from exposure to ambient air thus to isolate the valve assembly 35 and the incoming water through discharge 39. Freezing of the parts of valve assembly 35 is inhibited. In addition, the water circulation patterns 27A, 27B and 27C caused by the baffles 63 and 64 and the flow of water from discharge valve 39 down under the lower edges of the baffles 63 and 64 and up to the vicinity of the watering openings serves further to inhibit freezing water. In like fashion, during warm weather baffles 63, 64 serve to retard heat gain to the water from the relatively warmer ambient air.

Figure 5:
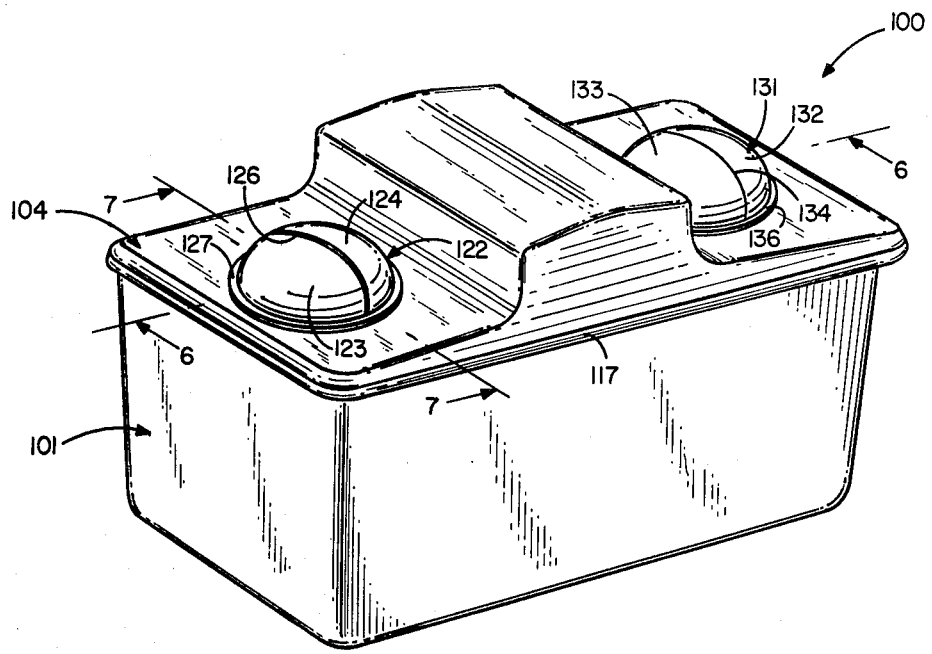
FIG. 5 is a perspective view of a first modification of the animal watering apparatus of the invention.
Figure 6:
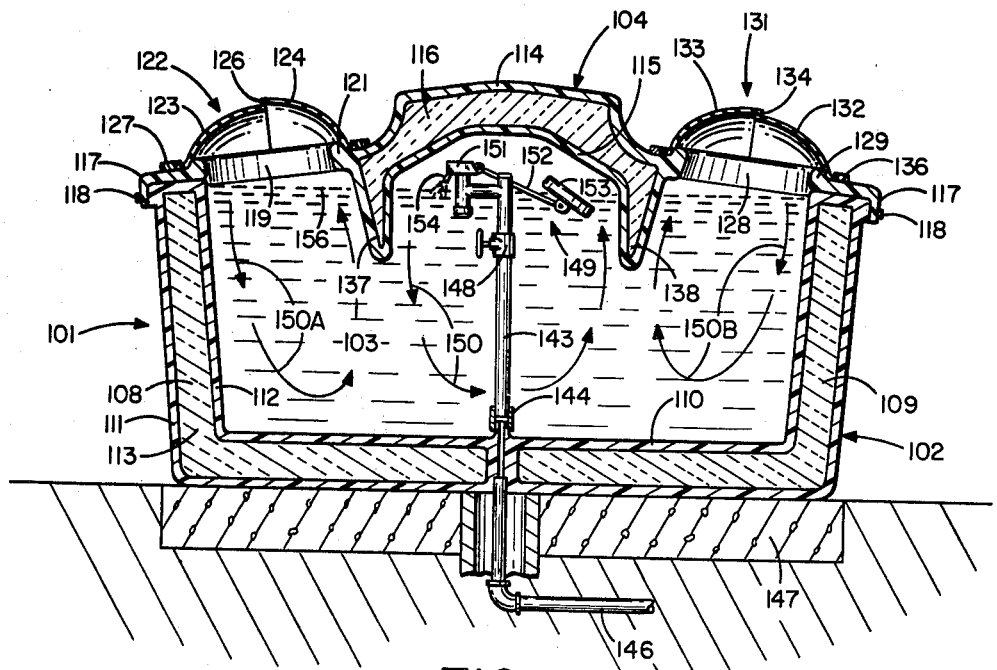
FIG. 6 is a sectional view taken along the line 6—6 of FIG. 5.
Figure 7:
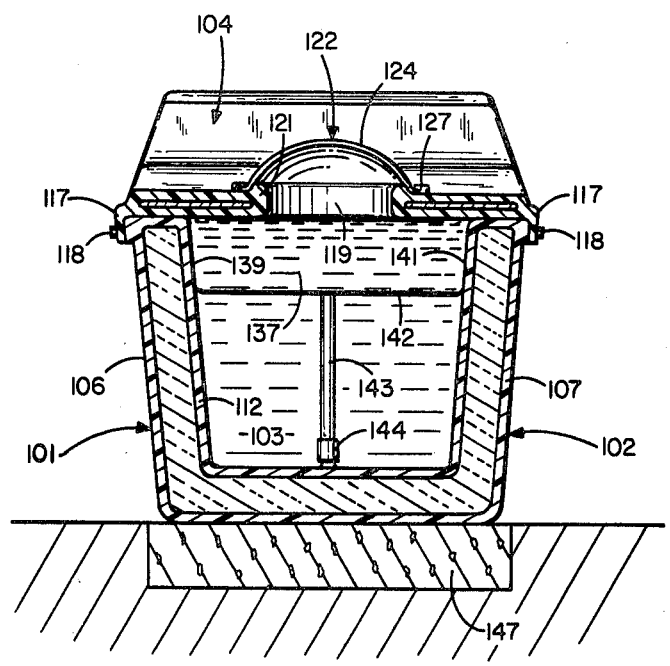
FIG. 7 is a sectional view taken along the line 7—7 of FIG. 5.

Referring to FIGS. 5-7, there is shown a first modification of the animal watering apparatus of the invention indicated generally at 100. Apparatus 100 is used to provide a source of drinking water for animals, as cattle and hogs, in both indoor and outdoor environments. The apparatus does not require electricity, gas, or auxiliary heat to keep the water from freezing. The ground water provides sufficient heat to keep the water in the apparatus from freezing.

Apparatus 100 has a tank comprising a generally box-shaped base or bottom unit 102 having a chamber 103 for accommodating a supply of water. The top of base 102 is closed with a top unit indicated generally at 104. Base 102 has upwardly and outwardly inclined sidewalls 106 and 107 joined to end walls 108 and 109.

The walls 106-109 are integral with the generally flat bottom wall 110 adapted to be located on a supporting surface, such as a concrete slab 147. The walls 106-110 have outer and inner shells 111 and 112 of plastic reinforced with fibers, such as glass fibers. A heat insulation core 113 is interposed between the shells 111 and 112. Core 113 can be a foam plastic, such as polyurethane or polystyrene foamed plastic. Other types of insulation materials can be used for core 113.

Top unit 104 is a heat insulating laminated structure having an outer shell or skin 114 and an inner shell or skin 115 located on opposite sides of a heat insulating core 116. Shells 114 and 115 are plastic reinforced with fibers, as glass fibers. Core 116 can be foam plastic, such as polyurethane or polystyrene. A downwardly directed flange 117 surrounds top unit 104. Flange 117 fits over the top edge of the side and end walls 106-109 and are secured thereto with a plurality of fasteners 118, such as screws or bolts. Other structures can be used to attach top unit 104 to the bottom unit or base 102.

Top unit 104 has a pair of drinking openings or holes 119 and 128 located on opposite sides of the center portion. An upwardly directed continuous rib 121 surrounds the hole 119. A cover 122 extends over opening 119. Cover 122 has a two section dome comprising a pair of quad-spherical members 123 and 124 having overlapping or meeting edges 126. A ring 127 secures members 123 and 124 to top unit 104. Fasteners, such as screws, are used to secure ring 127 to top unit 104. Members 123 and 124 are made of flexible material, such as rubber, or a flexible plastic. The nose of the animal is used to move members 123 and 124 in a downward direction thereby providing an opening through which the animal can drink the water in chamber 103. When the animal removes its nose from members 123 and 124, they return to their original shape or closed position.

An upwardly directed continuous rib 129 surrounds the second opening 128. A two section domed cover 131 is located over opening 128. Cover 131 comprises two quad-spherical members 132 and 133 having adjacent overlapping edges 134. A ring 136 secured with screws or the like to top unit 104 attaches the members 132 and 133 to top unit 104. Members 132 and 133 are made of flexible rubber-like or plastic materials. An animal can use its nose to flex and move members 132 and 133 to provide access to the water in the chamber 103. When the animal removes its nose from members 132 and 133, they return to their dome shape to close opening 128 from the outside air.

As shown in FIG. 6, a dam or baffle assembly comprising a pair of transverse dams or baffles 137 and 138 are located between openings 119 and 128 and the center portion of the top unit 104. As shown in FIG. 7, baffle 137 has downwardly directed inwardly inclined side edges 139 and 141 located in engagement with inside shell 112. The lower ends of sides 139 and 141 are joined to a transverse bottom edge 142. Bottom edge 142 is located below the normal water level 156 of the water in chamber 103 or the level of the water when the tank chamber 103 is full. The baffle 138 is identical in structure to the baffle 137. The baffles 137 and 138 extend into the top of chamber 103 about 8 to 10 cm. Other baffle widths can be used.

The water is supplied to chamber 103 through a water pipe 143 connected to a portion of the bottom wall 110 with a coupling 144. The bottom of tank 110 is connected to an inlet water supply pipe 146 located under the ground. The upper end of pipe 143 carries an on-off valve 148. Valve 148 can be manually turned on and off. A float valve assembly indicated generally at 149 is secured to the valve 148. Float valve assembly 149 has a valve unit or body 141 for controlling the flow of water from pipe 143 to chamber 103. An arm 151 is secured to the valving unit of body 151. A float 153 is attached to the outer end of arms 151. Body 151 functions to allow water to flow through a discharge nozzle 154 when the level of the water in the tank allows float 103 to move downwardly, thereby actuating the valving element body 151. When the water level reaches a predetermined level, as level 156 in FIG. 6, the float 153 will move arm 152 upwardly, thereby turning body 151 off. The water discharged through nozzle 154 flows downwardly and follows a generally circular central circulation pattern as indicated by arrows 150. Baffles 137 and 138 are air dams that continuously isolate the center portion of the water in chamber 103 and the float valve assembly 149 from the drinking openings 119 and 128. Baffles 137 and 138 also direct the water circulation patterns in the center area as well as the end areas of the chamber 103. The water circulation patterns in end areas or end sub-chambers are indicated by arrows 150A and 150B. This protects the float valve assembly 149 and water in the center of chamber 103 from the cold or warm air in the drinking openings 119 and 128. Covers 132 and 121 protect the water below the drinking openings 119 and 128 from the ambient air.

Referring to FIGS. 8–11, there is shown a second modification of the animal watering apparatus indicated generally at 200 for providing fresh water for animals, such as cattle. Watering apparatus 200 has a generally rectangular heat insulated tank 211 supporting a removable heat insulated top unit 212. Tank 211 has a base or generally rectangular bottom unit 214 having upright end walls 215 and 216 and upright side walls 217 and 218 and a generally flat bottom wall 220. The bottom unit 214 is a thermo or heat insulated box structure having an inner shell or wall 221 and an outer shell or wall 222 located on opposite sides of heat insulation material 225. Insulation material 225 is bonded to the inside surfaces of shells 221 and 222. The top of bottom unit 214 has a generally peripheral upper ledge or wall 223 which supports top unit 212. The shells 221 and 222 and ledge 223 are glass fiber reinforced plastic. The plastic of shells 221 and 222 are liquid impervious, rigid, and capable of withstanding substantial variations in temperature and pressure. The insulation material 225 is foamed plastic, such as polystyrene or polyurethane. Other types of insulation materials can be used to fill the space between the inner and outer shells 221 and 222.

Figure 9:
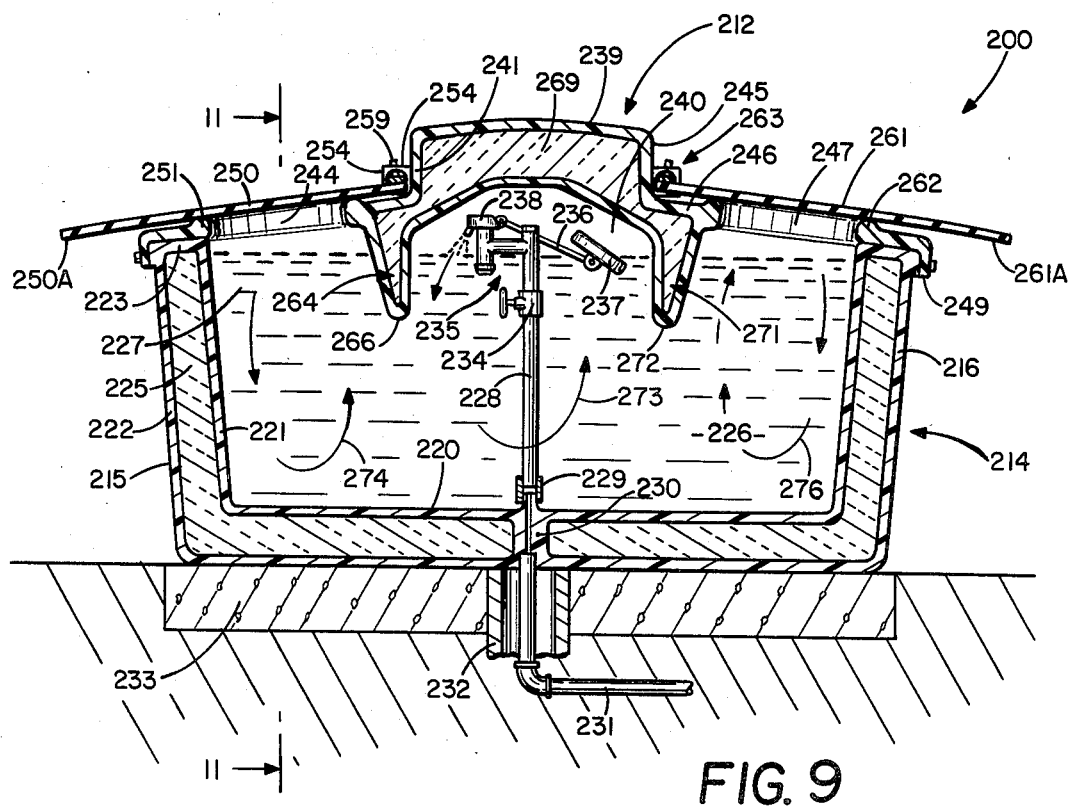
FIG. 9 is a sectional view taken along the line 9—9 of FIG. 8.

The inner shell 221 defines an open top chamber 226 for accommodating a liquid, such as water 227. As shown in FIG. 9, the water is supplied to chamber 226 through a water inlet pipe 228 connected with a coupling or nipple 229 to a portion 230 of bottom wall 220. A water supply pipe 231 delivers the water to the passage in portion 230. The pipe 231 is located within a tubular member or conduit 232 that is located below the ground and extends through a slab or support 233 for watering apparatus 200. The upper end of pipe 228 is attached to a hand-operated on-off valve 234 to control the flow of water to a float valve assembly indicated generally at 235. Float valve assembly 235 has a float arm 236 connected at its outer or free end to a float 237 that moves up and down in accordance with the level of the water 226 in chamber 226. Float arm 236 is operatively connected to a valve body 238. Up and down movement of arm 236 regulates the flow of water through valve body 238. When float 237 moves down, the valve body is turned on, thereby allowing water to be discharged into the chamber. When the level of the water is raised to a selected level in chamber 226, the float 237 will move arm 236 to an upward position to turn off the valve assembly 235. Float valve assembly 235 is a conventional float valve assembly for regulating the level of water in a tank. An example of a float valve assembly is shown in U.S. Pat. No. 3,835,882.

Top unit 212 has a central raised portion 239 surrounding an enclosed air space 240. The air space 240 accommodates the upper end of float valve assembly 235. Central portion 239 has a first end wall 241 joined to an outwardly directed end portion 242. End portion 242 has a generally circular drinking hole or opening 244 providing animal access to water 227 stored in chamber 226. The opposite side of mid-portion 239 has a second end wall 245 joined to an outwardly directed second end portion 246. End portion 246 has a second opening or hole 247 providing animal access to water 227 stored in chamber 226. Top unit 212 has an outer peripheral flange or lip 249 that surrounds and is secured to the upper ledge 223 of the outer shell 222. The top unit 212 is located in surface engagement with the ledge 223 and thereby closes the top of the tank 211.

Figure 8:
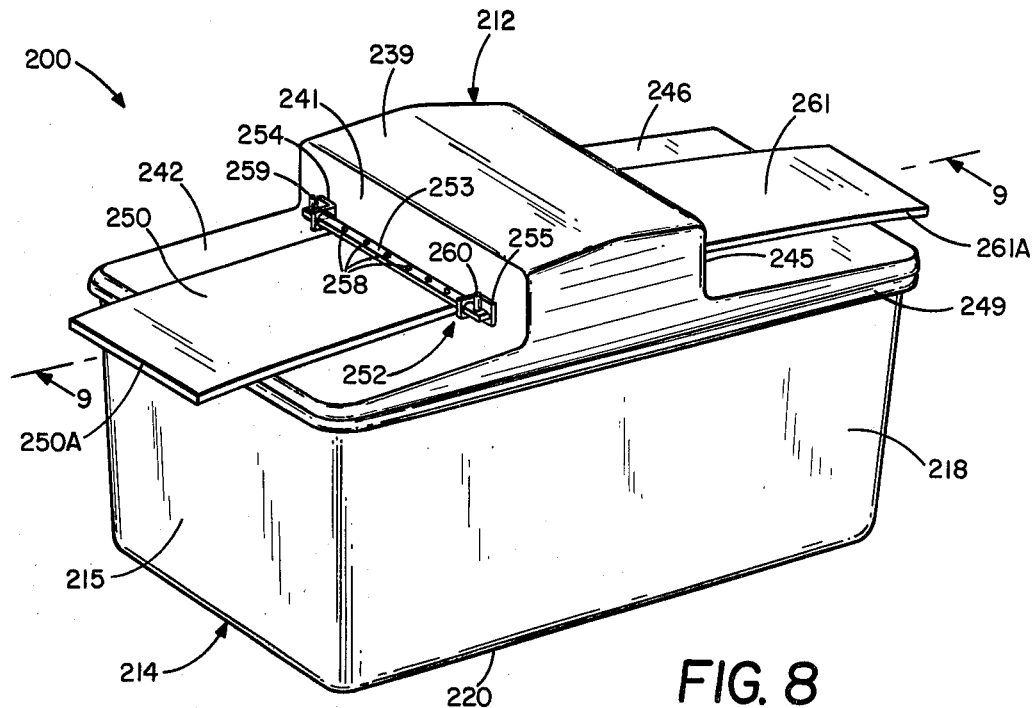
FIG. 8 is a perspective view of a second modification of the animal watering apparatus of the invention.
Figure 10:
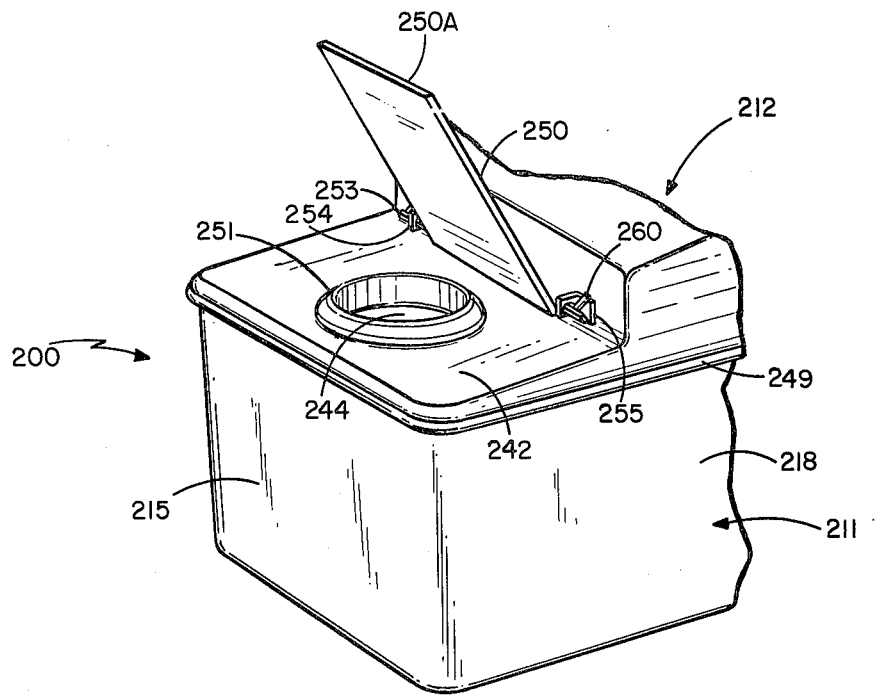
FIG. 10 is a fragmentary sectional view of one end of the animal watering apparatus of FIG. 8 showing the cover in its open position.
Figure 11:
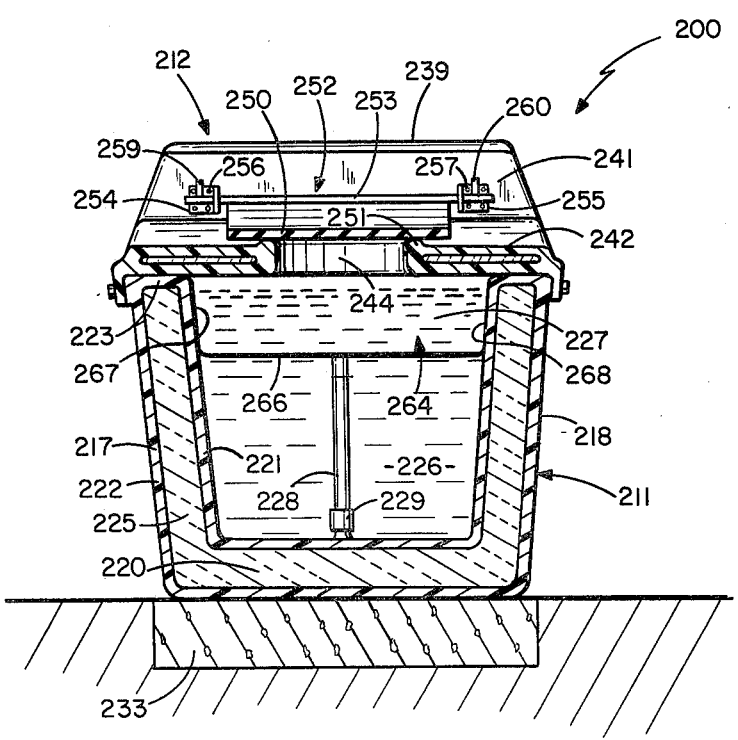
FIG. 11 is a sectional view taken along line 11—11 of FIG. 9.

A first cover 250 extends from the end wall 241 over the opening 244 to normally close the opening. The outer end 250A of the cover 250 extends outwardly from the lip 249 providing a generally flat surface enabling the nose of an animal to lift cover 250 to an open position, as shown in FIG. 10. The cover 250, when in the closed position, rests on an annular continuous rib 251 surrounding the opening 244 to close drinking opening 244 and preventing outside cold air from freezing the water in tank chamber 226. A hinge unit indicated generally at 252 pivotally connects cover 250 to an end wall 241. Hinge unit 252 has a transverse bar 253 rotatably mounted on a pair of brackets 254 and 255. The bar 253 has end portions which extend through circular holes in the brackets 254 and 255 thereby allowing the bar to rotate relative to the brackets 254 and 255. As shown in FIG. 11, a plurality of fasteners 256 and 257 secure brackets 254 and 255 to end wall 241. As shown in FIG. 8, connectors, such as rivets 258, secure the inner end of the cover 250 to bar 253.

As shown in FIGS. 8 to 11, upwardly directed pins 259 and 260 are secured to opposite ends of bar 253. Pins 259 and 260 limit lateral movement of bar 253 relative to brackets 254 and 255 and function as stop members which limit the upward pivotal movement or open position of cover 250. As shown in FIG. 10, stop pin 260 engages bracket 255 when cover 250 is in the open position. When the animal removes its head from cover 250, the cover 250 will fall to the closed position, as shown in FIG. 8.

Watering opening 247 is normally closed with a generally flat cover 261 having an outwardly directed lifting edge 261A. The cover 261, when in the closed position, rests on an annular upwardly directed flange or rib 262 surrounding opening 247 to close drinking opening 247 and preventing the outside cold air from freezing the water in tank chamber 226. The inner end of cover 261 is connected with a hinge unit indicated generally at 263 to the end wall 245. Hinge unit 263 is identical in structure and function to the hinge unit 252. Covers 250 and 261 are flap lids made of generally flat rectangular rubber sheets. Other types of materials can be used for covers 250 and 261.

Referring to FIG. 9, space 240 is separated from drinking opening 244 with a first transverse baffle or dam 264 and from drinking opening 247 with a second transverse baffle or dam 271. Baffle 264 has a transverse lower edge 266 that is normally located below the level of water 227 in chamber 226. As shown in FIG. 11, baffle 264 has upwardly and outwardly sloping side edges 267 and 268 located in engagement with the inner shell 221. Baffle 271 has a transverse lower edge 272 located below the level of the water in chamber 226. Baffle 271 also has upwardly and outwardly directed side edges located in engagement with the inner shell 221.

Baffles 264 and 271 are spaced inwardly from drinking openings 244 and 247 and converge downwardly toward the bottom wall 220 of tank 214 to avoid obstructing the drinking openings 244 and 247. Both baffles 264 and 271 are integral with the inside plastic shell of top wall 212 and have cores of heat insulation material 269.

In use, when one or more animals are drinking water, they open covers 250 and 261 allowing the outside air into the spaces below openings 244 and 247. The baffles 264 and 271 isolate the central chamber or space 240 from the outside air that enters through openings 244 and 247. When the level of water 227 approaches the bottom of the baffles 264 and 271, valve assembly 235 is open whereby a supply of water is discharged into tank chamber 226. The water entering the chamber through the valve assembly is relatively warmer than the ambient air under winter conditions. The water will circulate in the central portion of the chamber, as indicated by the arrow 273. The circulation of the warmer water in the center portion of the chamber inhibits the freezing of the water in the pipe 228, as well as the freezing of water in valve assembly 235. The baffles provide transverse generally vertical barriers or walls which serve to substantially confine the circulation 273 to the center area or sub-chamber of chamber 226. The water in the outer ends of the chamber being colder will circulate, as indicated by the arrows 274 and 276 in FIG. 9. The baffles 264 and 271 have inwardly sloping or tapered walls which facilitate the circulatory patterns of the water in the end sub-chambers of chamber 266. The circulation of the water in the tank chamber 226 inhibits the freezing of the water. When covers 250 and 261 are closed, they trap the air above the water and in the openings 244 and 247. This air serves as an air insulating barrier or buffer to inhibit the freezing of the water.

Figure 15:
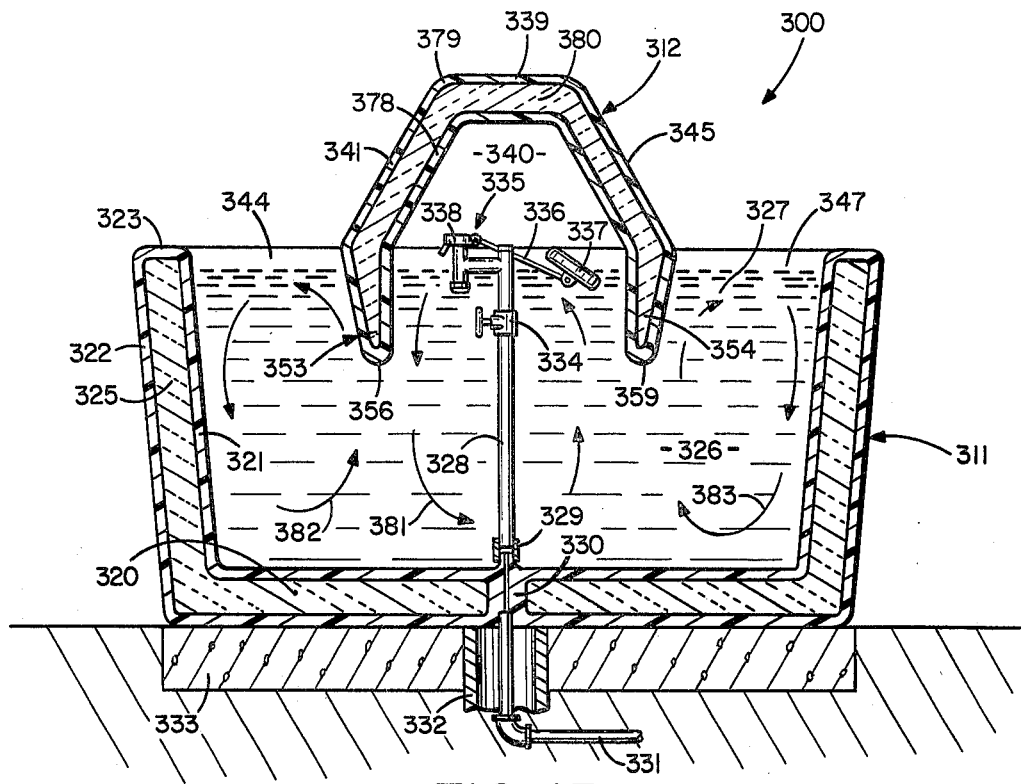
FIG. 15 is an enlarged sectional view taken along the line 15—15 of FIG. 14.

Referring to FIGS. 12 to 17, there is shown a third modification of an animal watering apparatus of the invention, indicated generally at 300 for providing drinking water for animals, such as cattle. Watering apparatus 300 has a generally rectangular tank 311 supporting a top unit 312. Tank 311 is a bottom unit having generally upright end walls 315 and 316 joined to side walls 317 and 318. Walls 315 to 318 are joined to a generally flat bottom wall 320 to form a one-piece box structure having a chamber 326 for holding fluid, as water 327. As shown in FIG. 15, tank 311 has a inner shell 321, an outer shell 322 joined together at an upper peripheral ledge 323 and at the bottom wall 320. Insulation material 325 is located between and bonded to the inner and outer shells. The shells 321 and 322 are a rigid material, such as plastic reinforced with glass fiber. The insulation is a foam plastic, such as polyurethane or polystyrene. Other types of materials may be used to form shells 321 and 322 and the insulation material 325.

A water supply system is located in the center portion of tank 311. The water supply system includes a water inlet pipe 328 joined with a connector or coupling 329 to a portion of bottom wall 320. A water supply pipe 321 extends through a conduit or pipe 332 and a support slab 333 and is connected to the bottom of tank 311. The upper end of pipe 328 is connected to a manually operated on-off valve 324. A float valve assembly 335 is mounted on valve 334. The float valve assembly 335 is a conventional float operated valve 338 having a float arm 326, a float 337 connected to arm 336, and a valve 338 operated in response to movement of the float 337 and arm 336. The float valve assembly 335 is identical with the float valve assembly 235.

The top unit 312 has a central portion 339 enclosing a space 340 surrounding float valve assembly 335. The top unit 312 has upwardly inclined walls 341 and 345 joined to side walls 348 and 349 and downwardly directed first and second dams or transverse baffles 353 and 354. The side walls 341 and 345 and baffles 353 and 354 are a one-piece unit having an inner shell 378, an outer shell 379, and insulation material 380 located between and bonded to the inner and outer shells. The shells 378 and 379 are plastic reinforced with glass fibers. The insulation material is preferably a foam plastic, such as polyurethane or polystyrene or the like.

Figure 16:
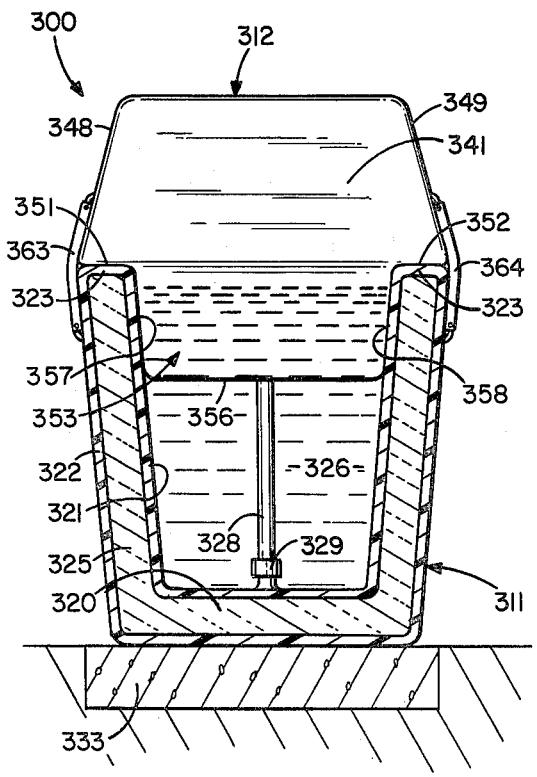
FIG. 16 is an enlarged sectional view taken along the line 16—16 of FIG. 14.
Figure 17:
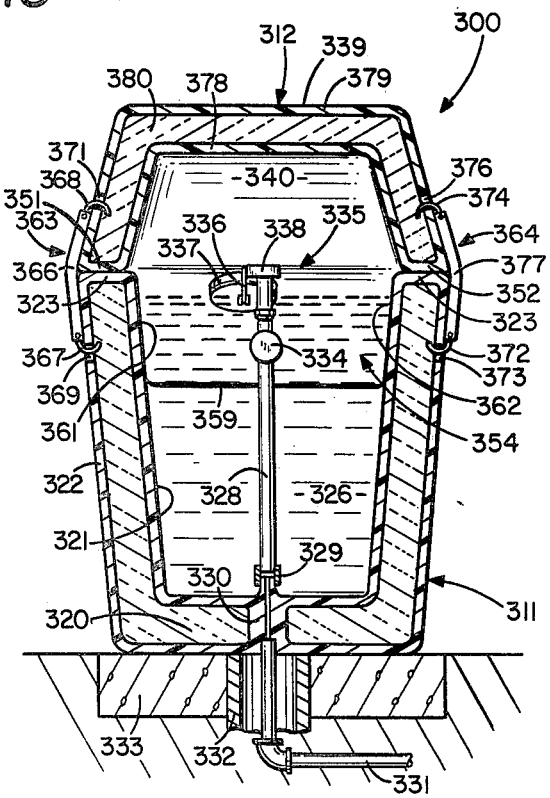
FIG. 17 is an enlarged sectional view taken along the line 17—17 of FIG. 14.

As shown in FIGS. 16 and 17, top unit 312 has shoulders or ledges 351 and 352 that rest on the top portion 323 of the tank 311. Shoulders 351 and 352 are in flat sealing surface engagement with the top portion 323 to prevent outside air from flowing into space 340.

The top portion 323 can have recesses or grooves in the mid-sections of tank side walls 317 and 318. The side walls 348 and 349 of the top unit 312 fit into the recesses. Generally flat covers, such as covers 250 and 261, can be hinged to opposite sides of top portion 323 to close the top openings of the tank 311. Hinge assemblies, as hinge assemblies 252 and 263, can be used to connect the covers to the top unit 312. The covers trap air above the water 327 in opposite ends of the tank to inhibit freezing of the water in cool weather.

The first baffle 353 has a transverse lower edge 356 located below the surface of the water 327 in tank chamber 326. As shown in FIG. 16, baffle 353 has side edges 357 and 358 that extend upwardly and outwardly from the lower edge 356 and are in engagement with the inside surfaces of the inner shell 321. The second baffle 354 has a lower transverse edge 359 located below the surface of water 327 in tank chamber 326 and upwardly and outwardly directed side edges 361 and 362. As shown in FIG. 17, side edges 361 and 362 are located in engagement with the opposite portions of the inner shell 321 to prevent outside air from flowing into the enclosed space 340.

The top unit 312 is releasably held in the central position on top of tank unit 311 with a pair of elastic connectors 363 and 364. Connector 363, as shown in FIG. 17, comprises an elongated elastic strap 366 joined to at its opposite ends 367 and 368. The strap 366 can be a coil spring. Hook 367 extends through a hole 369 in the shell 322. Hook 368 extends through a hole 371 in the outer shell 379 of top unit 312. Connector 364 connects the opposite side of the top unit 312 to tank 311. Connector 364 comprises an elongated strap 377 connected to hooks 372 and 374. Hook 372 extends through a hole 373 in the outer shell 322 of tank unit 311. Hook 374 extends through a hole 376 in the outer shell 379 of top unit 312. The outer shells 322 of the tank 311 and 379 of the top unit 312 can be reinforced with washers or additional plastic material in the area surrounding the holes. Connectors 363 and 364 can be released from top unit 312. Top unit 312 can then be removed from tank 311 to adjust and service the float valve assembly. Other types of releasable connectors can be used to hold top unit 312 on tank 311.

In use, drinking openings 344 and 347 are open to the atmosphere whereby water 327 is readily available for drinking by the animals. The top unit 312 encloses the valve assembly 335 in the space 340 and protects the valve assembly 335 from the animals and isolates the water in the center of chamber 326 and valve assembly 335 from outside air. The baffles 353 and 354 extended downwardly below the level of the water 327 function as barriers to prevent outside air from flowing into space 340 as the level of the water is lowered when the animals are drinking. Float valve assembly 335 will automatically turn on when the water level approaches the bottom of the edges of the baffles 353 and 354. The water in the center sub-chamber of the tank will circulate in a generally circulate direction around the valve assembly and pipe 328, as indicated by arrows 381 in FIG. 15. The circulation of relatively warm water in the center portion of chamber 326 inhibits freezing of water in pipe 328 and valve assembly 335. Baffles 353 and 354 provide transverse generally vertical barriers or walls which serve to substantially confine the circulation 381 to the center of sub-chamber of chamber 326. The water in the opposite ends of the tank will have a circulation, as indicated by the arrows 382 and 383. The cold water from the top of the tank will move down. The warmer water will move up. This circulation is continuous and is enhanced by downwardly converging outside walls of baffles 353 and 354 which serve as means or guides for directing the water circulation patterns 382 and 383 of the water in end sub-chambers of chamber 326.

While there has been shown and described preferred embodiments of an animal watering apparatus according to the invention, it will be apparent to those skilled in the art that certain deviations may be had from the embodiments shown without departing from the scope and spirit of the invention.

The embodiments of the invention in which an exclusive property or privilege is claimed are defined as follows:

1. An animal watering apparatus comprising:
   a tank having side walls and end walls and a bottom wall defining a water chamber;
   a top wall mounted on the side walls;
   a first drinking opening located above a first end portion of the tank and open to the chamber;
   a second drinking opening located above a second end portion on the tank open to the chamber;
   water inlet means adapted to admit water to the chamber at a location between the first and second drinking openings and maintain the water at a preselected level in the chamber;
   a first baffle secured to and extended downwardly from the top wall to a location beneath the preselected water level in the chamber and extended between the side walls in dividing relationship between the first drinking opening and the water inlet means to isolate the water inlet means from the first drinking opening; and
   a second baffle secured to and extended downwardly from the top wall to a location beneath the preselected water level in the chamber and extended between the side walls in dividing relationship between the second drinking opening and the water inlet means to isolate the water inlet means from the second drinking opening, each baffle comprising a transverse member having a lower edge located beneath the preselected water level and ends located in engagement with the side walls of the tank, said transverse member having a generally vertical inside wall for guiding the water in the central portion of the chamber in a generally circular pattern around the water inlet means, and a downwardly converging outside surface for facilitating the circulation of water in the end portions of the chamber thereby inhibiting freezing of water in the tank chamber.

2. The apparatus of claim 1 including:
   means removably mounting the top wall on the side walls of the tank.

3. The apparatus of claim 1 wherein:
   said side walls, end walls, bottom wall and first and second baffles include heat insulation means.

4. The apparatus of claim 1 including:
   biasing means connected to the top wall and side walls of the tank for holding the top wall on the side walls of the tank.

5. The apparatus of claim 1 wherein:
   the side walls have top ledges, and said top wall has shoulders engagable with said top ledges.

6. The apparatus of claim 1 including:
   a first cover for closing the first drinking opening, first means movably mounting the first cover on the top wall for movement from a closed position to an open position, a second cover for closing the second drinking opening, and second means movably mounting the second cover on the top wall for movement from a closed position to an open position.

7. The apparatus of claim 6 wherein:
   each cover is a generally flat lid.

8. The apparatus of claim 6 wherein:
   the first and second means each comprises a hinge assembly having a transverse member secured to a cover, bracket means rotatably mounting the transverse member about a generally horizontal transverse axis, and stop means on the transverse member limiting rotation of the transverse member and open position of the cover.

9. The apparatus of claim 8 wherein:
   the stop means includes pins attached to opposite ends of the transverse member, said pins being engagable with the bracket means when the cover is in the open position.

10. The apparatus of claim 6 wherein:
    said top wall has a raised center portion located between said first and second end portions;
    said first cover being hingedly connected to the central portion with an outer lip extended beyond a first of said end walls when in the closed position for engagement by the nose of an animal to gain access to the first drinking opening;
    said second cover being hingedly connected to the central portion with an outer lip extended beyond the second of said end walls when in the closed position for engagement by the nose of an animal to gain access to the second drinking opening.

11. An animal watering apparatus comprising:
a tank having side walls and end walls defining a water chamber;
a top wall covering said side walls and the chamber;
water inlet means located in a first section of the chamber to admit water to the chamber and maintain it at a preselected level in the chamber;
at least one drinking opening in the top wall open to a second section of the chamber;
cover means normally closing said at least one drinking opening in a closed position and movable to an open position in uncovered relationship to said at least one drinking opening to permit access to the water in the chamber by an animal; and
baffle means secured to and extended downward from the top wall to a location beneath the normal water level and extended between the side walls and between said at least one drinking opening and the water inlet means to isolate the water inlet means from said at least one drinking opening, said baffle means comprising a transverse member having a lower edge located beneath the preselected water level and ends located in engagement with the side walls of the tank, said transverse member having a generally vertical inside wall for guiding the water in the first section of the chamber in a generally circular pattern, and a downwardly converging outside surface for facilitating the circulation of water in the second section of the chamber thereby inhibiting freezing of water in the chamber.

12. The apparatus of claim 11 wherein:
said tank has a bottom wall, said water inlet means comprising a water pipe extending upwardly through the chamber operable to carry fresh water, a float valve assembly assembled to the water pipe operable to control flow of water to maintain water at said preselected level.

13. The apparatus of claim 11 including:
a second drinking opening located in said top wall, second cover means normally closing the second drinking opening in a closed position and movable to an open position in uncovered relationship to the second drinking opening to permit access to water in a third section of the chamber by an animal; and
second baffle means extended downwardly from the top wall to isolate the second drinking opening from the water inlet means, said second baffle means comprising a transverse member having a lower edge located beneath the preselected water level and ends located in engagement with the side walls of the tank, said transverse member having a generally vertical inside wall for guiding the water in the first section of the chamber in a generally circular pattern, and a downwardly converging outside surface for facilitating the circulation of water in the third section of the chamber thereby inhibiting freezing of water in the chamber.

14. The apparatus of claim 13 wherein:
said tank has a bottom wall, said water inlet means including a water pipe extending upwardly in the chamber, a float valve assembly assembled to the water pipe between said first and second baffle means operable to control flow of water to maintain water at set preselected level.

15. The apparatus of claim 11 wherein:
the cover means is generally flat lid, and hinge means pivotally mounting the lid on the top wall for movement between open and closed positions.

16. The apparatus of claim 15 wherein:
the hinge means includes a transverse member secured to the cover means, bracket means rotatably mounting the transverse member about a generally horizontal transverse axis, and stop means on the transverse member limiting rotation of the transverse member and open position of the cover means.

17. The apparatus of claim 16 wherein:
the stop means includes pins attached to opposite ends of the transverse member, said pins being engagable with the bracket means when the cover means is in the open position.

18. An animal watering apparatus comprising:
tank means having a chamber for storing water, said tank means having an open top and heat insulated side walls, end walls and a bottom wall surrounding the chamber;
water inlet means located in a first upper section of the chamber for maintaining water in said chamber at a preselected water level;
top wall means mounted on the side walls and end walls closing the open top of the tank means;
said top wall means and tank means providing least one drinking opening in communication with a second upper section of the chamber providing animal drinking access to the water in the chamber; and
baffle means extended into the water in the chamber to separate said at least one drinking opening from the water inlet means for maintaining the water in said chamber, said baffle means extended between said side walls providing an air seal between the first section of the chamber and the second section of the chamber, said baffle means comprising a transverse member having a lower edge located beneath the preselected water level and ends located in engagement with the side walls of the tank, said transverse member having a generally vertical inside wall for guiding the water in the first section of the chamber in a generally circular pattern, and a downwardly converging outside surface for facilitating the circulation of water in the second section of the chamber thereby inhibiting freezing of water in the chamber.

19. The apparatus of claim 18 wherein:
said top wall means and tank means provide a second drinking opening in communication with a third section of the chamber, said baffle means separating the second drinking opening from the water inlet means for maintaining the water in said chamber, said baffle means extended between said side walls providing an air seal between the third section of the chamber and the first section of the chamber.

20. The apparatus of claim 19 wherein:
said baffle means includes a first baffle on the top wall means extended into said chamber separating the first section from the second section of the chamber and a second baffle on the top wall means separating the third section from the first section, each baffle having opposite ends engagable with portions of the tank means and a bottom edge located below the level of water in the chamber when the chamber is full of water, said second baffle comprising a transverse member having a lower edge located beneath the preselected water level and ends located in engagement with the side walls of the tank, said transverse member having a generally vertical inside wall for guiding the water in the first section of the chamber in a generally circular pattern, and a downwardly converging outside surface for facilitating the circulation of water in the third section of the chamber thereby inhibiting freezing of water in the chamber.

21. The apparatus of claim 20 including:

biasing means connected to the top wall means and side walls for holding the top wall means on the side walls of the tank means.

22. The apparatus of claim 21 wherein:

the side walls have top ledges, and said top wall means has shoulders engagable with said top ledges, said biasing means holding the shoulders in engagement with the top ledges.

23. The apparatus of claim 19 including:

cover means covering the first drinking opening and the second drinking opening and movable by an animal to an open position to provide access to water in the chamber.

24. The apparatus of claim 23 wherein:

said cover means includes a first cover hingedly assembled to a central portion of the top wall means and pivotal between a position in closing relationship to the first drinking opening and a position in uncovered relationship to the first drinking opening, and a second cover pivotally assembled to a central portion of the top wall means and movable between a position in covering relationship to the second drinking opening and an opening to permit access to water in the chamber by an animal.

* * * * *